US009824517B2

(12) United States Patent
Skonberg et al.

(10) Patent No.: US 9,824,517 B2
(45) Date of Patent: Nov. 21, 2017

(54) CONCEPTS FOR ASSET IDENTIFICATION

(71) Applicant: United Parcel Service of America, Inc., Atlanta, GA (US)

(72) Inventors: Carl M Skonberg, Wyckoff, NJ (US); Ernest J. Pyzocha, Jr., New Albany, IN (US); Andrew J. Hill, III, Louisville, KY (US); Bobby J. McFarland, Mount Washington, KY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 231 days.

(21) Appl. No.: 14/036,535

(22) Filed: Sep. 25, 2013

(65) Prior Publication Data

US 2014/0104035 A1 Apr. 17, 2014

Related U.S. Application Data

(60) Provisional application No. 61/713,330, filed on Oct. 12, 2012.

(51) Int. Cl.
*G05B 19/00* (2006.01)
*G07C 9/00* (2006.01)

(52) U.S. Cl.
CPC ................................ *G07C 9/00111* (2013.01)

(58) Field of Classification Search
None
See application file for complete search history.

(56) References Cited

U.S. PATENT DOCUMENTS

| | | | |
|---|---|---|---|
| 4,831,539 A | | 5/1989 | Hagenbuch |
| 5,008,661 A | | 4/1991 | Raj |
| 5,068,656 A | | 11/1991 | Sutherland |
| 5,347,274 A | * | 9/1994 | Hassett ......................... 340/988 |
| 5,365,516 A | | 11/1994 | Jandrell |
| 5,532,521 A | | 7/1996 | Leininger |
| 5,664,113 A | * | 9/1997 | Worger et al. .................. 705/28 |

(Continued)

FOREIGN PATENT DOCUMENTS

| | | |
|---|---|---|
| CN | 101315710 A | 12/2008 |
| CN | 101853534 A | 10/2010 |

(Continued)

OTHER PUBLICATIONS

International Preliminary Examining Authority, Second Written Opinion for International Application No. PCT/US2013/061833, dated Sep. 11, 2014, 5 pages, European Patent Office, The Netherlands.

(Continued)

*Primary Examiner* — Curtis King
(74) *Attorney, Agent, or Firm* — Alston & Bird LLP

(57) ABSTRACT

Systems, methods, apparatus, and computer program products are provided for identifying assets (e.g., mobile assets and/or personnel assets). In one embodiment, a mobile asset can be uniquely identified from RFID tags. In another embodiment, mobile assets and personnel assets can be identified from captured image data. After identification, it can be determined whether the asset (e.g., mobile asset and/or personnel asset) is authorized for one or more activities and a corresponding perceivable indication can be generated.

23 Claims, 9 Drawing Sheets

(56) References Cited

U.S. PATENT DOCUMENTS

| | | | | |
|---|---|---|---|---|
| 5,751,973 | A * | 5/1998 | Hassett | 705/13 |
| 5,848,373 | A | 12/1998 | DeLorme et al. | |
| 5,869,819 | A | 2/1999 | Knowles et al. | |
| 5,917,433 | A | 6/1999 | Keillor et al. | |
| 5,959,568 | A * | 9/1999 | Woolley | 342/42 |
| 6,087,965 | A | 7/2000 | Murphy | |
| 6,089,284 | A * | 7/2000 | Kaehler | B67D 7/348 141/2 |
| 6,124,810 | A | 9/2000 | Segal et al. | |
| 6,148,291 | A | 11/2000 | Radican | |
| 6,349,211 | B2 | 2/2002 | Koshima et al. | |
| 6,356,802 | B1 | 3/2002 | Takehara et al. | |
| 6,389,334 | B1 | 5/2002 | Castor | |
| 6,405,132 | B1 | 6/2002 | Breed et al. | |
| 6,430,496 | B1 | 8/2002 | Smith et al. | |
| 6,659,344 | B2 | 12/2003 | Otto et al. | |
| 6,665,585 | B2 | 12/2003 | Kawase | |
| 6,721,652 | B1 | 4/2004 | Sanqunetti | |
| 6,741,927 | B2 | 5/2004 | Jones | |
| 6,745,027 | B2 | 6/2004 | Twitchell, Jr. | |
| 6,828,924 | B2 | 12/2004 | Gustavsson et al. | |
| 6,995,667 | B2 | 2/2006 | He et al. | |
| 7,034,683 | B2 | 4/2006 | Ghazarian | |
| 7,069,239 | B2 | 6/2006 | Fawcett et al. | |
| 7,164,986 | B2 | 1/2007 | Humphries et al. | |
| 7,273,172 | B2 | 9/2007 | Olsen, III et al. | |
| 7,379,805 | B2 | 5/2008 | Olsen, III et al. | |
| 8,130,104 | B1 * | 3/2012 | Braiman | 340/572.4 |
| 2001/0025222 | A1 | 9/2001 | Bechtolsheim et al. | |
| 2002/0004703 | A1 | 1/2002 | Gaspard | |
| 2002/0161675 | A1 * | 10/2002 | Kawase | 705/29 |
| 2003/0003777 | A1 | 1/2003 | Lesesky et al. | |
| 2003/0055556 | A1 | 3/2003 | Hashida | |
| 2003/0060938 | A1 | 3/2003 | Duvall | |
| 2003/0120522 | A1 | 6/2003 | Uyeki | |
| 2003/0128630 | A1 | 7/2003 | Krygler et al. | |
| 2003/0137968 | A1 | 7/2003 | Lareau et al. | |
| 2003/0169337 | A1 | 9/2003 | Wilson et al. | |
| 2003/0190911 | A1 | 10/2003 | Hirano | |
| 2003/0195699 | A1 | 10/2003 | Jones | |
| 2003/0204407 | A1 | 10/2003 | Nabors et al. | |
| 2003/0218539 | A1 * | 11/2003 | Hight | G08B 21/0244 340/539.13 |
| 2003/0227392 | A1 * | 12/2003 | Ebert | G06K 17/00 340/8.1 |
| 2004/0017281 | A1 * | 1/2004 | Dix | B60R 25/04 340/5.61 |
| 2004/0039632 | A1 * | 2/2004 | Han | G06Q 20/32 705/13 |
| 2004/0055345 | A1 | 3/2004 | Moore | |
| 2004/0077347 | A1 | 4/2004 | Lauber et al. | |
| 2004/0102896 | A1 | 5/2004 | Thayer et al. | |
| 2004/0233036 | A1 | 11/2004 | Sefton | |
| 2005/0017855 | A1 | 1/2005 | Harvey | |
| 2005/0057373 | A1 | 3/2005 | Noguchi | |
| 2005/0061877 | A1 | 3/2005 | Stevens | |
| 2005/0073434 | A1 * | 4/2005 | Arquette et al. | 340/907 |
| 2005/0083213 | A1 | 4/2005 | Stevens et al. | |
| 2005/0090262 | A1 * | 4/2005 | Hamano | H04W 36/0011 455/445 |
| 2005/0101268 | A1 * | 5/2005 | Radosta | G06Q 10/08 455/115.1 |
| 2005/0110610 | A1 | 5/2005 | Bazakos et al. | |
| 2005/0174258 | A1 | 8/2005 | Yamanouchi et al. | |
| 2005/0192702 | A1 | 9/2005 | Moutsokapas | |
| 2005/0203683 | A1 * | 9/2005 | Olsen | B60R 25/1004 701/29.3 |
| 2005/0253703 | A1 | 11/2005 | He et al. | |
| 2005/0278063 | A1 | 12/2005 | Hersh et al. | |
| 2006/0011721 | A1 | 1/2006 | Olsen et al. | |
| 2006/0015233 | A1 * | 1/2006 | Olsen et al. | 701/50 |
| 2006/0030985 | A1 * | 2/2006 | Lawida | G06K 9/3241 701/33.4 |
| 2006/0106504 | A1 | 5/2006 | Carpenter | |
| 2006/0208924 | A1 * | 9/2006 | Matalon | G07B 15/063 340/933 |
| 2006/0238340 | A1 | 10/2006 | Harvey | |
| 2006/0251498 | A1 * | 11/2006 | Buzzoni | B65G 63/004 414/139.9 |
| 2007/0034686 | A1 | 2/2007 | Davis et al. | |
| 2007/0161370 | A1 * | 7/2007 | Alberi-Morel | H04W 28/14 455/422.1 |
| 2007/0198174 | A1 * | 8/2007 | Williams | G06Q 10/047 705/1.1 |
| 2008/0040210 | A1 * | 2/2008 | Hedley | G06Q 30/04 705/13 |
| 2008/0303636 | A1 * | 12/2008 | Chatte | G06Q 10/08 340/10.41 |
| 2009/0003263 | A1 * | 1/2009 | Foster | H04W 36/0033 370/328 |
| 2009/0101709 | A1 | 4/2009 | Nonaka | |
| 2009/0140854 | A1 * | 6/2009 | Golander | G08B 13/2494 340/540 |
| 2009/0212950 | A1 * | 8/2009 | Cheng | G06K 19/041 340/572.1 |
| 2009/0243854 | A1 * | 10/2009 | Scheid | G06Q 10/06 340/572.1 |
| 2009/0254240 | A1 | 10/2009 | Olsen, III et al. | |
| 2010/0065646 | A1 * | 3/2010 | Couck | G06F 21/86 235/492 |
| 2010/0073124 | A1 * | 3/2010 | Mahalingaiah | G07C 5/006 340/5.1 |
| 2010/0114616 | A1 * | 5/2010 | Touati | B60R 25/2018 705/5 |
| 2010/0262430 | A1 * | 10/2010 | Gips | G06F 19/327 705/2 |
| 2011/0137773 | A1 * | 6/2011 | Davis, III | G01G 19/4142 705/34 |
| 2012/0274482 | A1 | 11/2012 | Chen et al. | |
| 2012/0293301 | A1 | 11/2012 | Friedman et al. | |
| 2012/0306636 | A1 * | 12/2012 | Tieman | B60R 25/20 340/426.24 |
| 2013/0238536 | A1 * | 9/2013 | Outwater | B60L 11/1846 706/12 |
| 2014/0078303 | A1 | 3/2014 | Mattern | |
| 2016/0196702 | A1 | 7/2016 | Wilson | |

FOREIGN PATENT DOCUMENTS

| | | | |
|---|---|---|---|
| CN | 102364504 | A | 2/2012 |
| CN | 102713954 | A | 10/2012 |
| EP | 1182154 | A1 | 2/2002 |
| EP | 1338735 | A1 | 8/2003 |
| JP | 1214504 | A | 8/1989 |
| WO | WO 03/100732 | A1 | 12/2003 |
| WO | WO 2010/105333 | A1 | 9/2010 |

OTHER PUBLICATIONS

Kathleen Hickey, Insecurity Over E-Seals, Traffic World, Jan. 19, 2004, 1 page.

A Truly Global Tracking System with True Security, All Set Wireless Tracking, Accessed Feb. 2004, p. 1, http://www.allset.se/tracking/solutions.overview.asp.

All Set Tracking Launches a New Revolutionary Electronic Seal, All Set Marine Security, Accessed in Oct. 2004, Dated Sep. 17, 2002, p. 1, http://www.allset.se/security /news/Articles/default.asp?articleID=14.

We Make Electronic Sealing Easy and Economical, All Set Wireless Tracking, Accessed in Feb. 2004, pp. 1-2, http://www.allset.se/tracking/solutions/products.asp.

Keep Track of Your Containers, All Set Wireless Tracking, Accessed in Feb. 2004, pp. 1-3, http://www.allset.se/tracking/solutions/scenarios.asp.

Elementary Solutions for a Moving World, All Set Wireless Tracking, Accessed in Feb. 2004, p. 1, http://www.allset.se/tracking/.

All Set System Installed Onboard RoRo Ship, All Set Wireless Tracking, Accessed in Feb. 2004, Dated May 26, 2003, p. 1, http://www.allset.se/tracking/news/Articles/default.asp?articleID=19.

(56) References Cited

OTHER PUBLICATIONS

CIMC and All Set in "Smart and Secure Container" Alliance, All Set Wireless Tracking, Accessed in Feb. 2004, Dated Apr. 4, 2003 pp. 1-2, http://www.allset.se/tracking/news/Articles/default.asp?articleID=16.
Cargo Container With Smart Systems Alerts Global Network in Real Time About Security Breaches and In-the-Box Changes, News/Events: Press Releases, Accessed Feb. 2004, pp. 1-4, http://www.savi.com/news_events/2003releases/oct29-03.a.html.
Savi Solutions, Savi Technology, Accessed Feb. 2004, p. 1, http://www.savi.com/solutions/index.html.
Savi Search, Savi Technology, Accessed Feb. 2004, pp. 1-2, http://www.savi.com/cgi-bin/sitesearch/search_savi.cgi.
Savi Technology Launches SmartSeal™ Cargo Security System, News/Events: Press Releases, Accessed Feb. 2004, pp. 1-2, http://www.savi.com/news_events/2001releases/oct3-01.html.
About Hi-G-Tek , Hi-G-Tek, Accessed Feb. 2004, pp. 1-2, http://www.higtek.com/company.htm.
Secured Cargo, Hi-G-Tek, Accessed Feb. 2004, pp. 1-4, http://www.higtek.com/cargo.htm.
Hi-G-Tek Diamond are Forever, Hi-G-Tek, Accessed Feb. 2004, p. 1, http://www.higtek.com/images/article.gif.
Our Business, Elogicity, Accessed Feb. 2004, p. 1, http://www.elogicity.com/about_us.htm.
Solutions, Elogicity, Accessed Feb. 2004, p. 1, http://www.elogicity.com/solutions.htm.
Cargo Security Your Source for Supply Chain Cargo Security Products, CGM Security Solutions, Accessed Feb. 2004, pp. 1-2, http://www.cgmsecuritysolutions.com/sw/swchannel/homepage/internet/schomepage.asp?. . . .
Our Products, CGM Security Solutions, Accessed Feb. 2004, pp. 1-4, http://www.cgmsecuritysolutions.com/sw/swchannel/productcatalogcf_v2/internet/Product.
Warehouse Operations Committee (Agenda), IARW, Jul. 27, 2003, 44 pages.
Freight Containers—Radio-Frequency Communication Protocol for Electronic Seal, ISO Document, Sep. 27, 2003, 23 Pages, Geneva, Switzerland.
U.S. Treasury Advisory Committee on Commercial Operations of the United States Customs Service (COAC) Subcommittee on US Border Security Technical Advisory Group & Customs Trade Partnership Against Terrorism (C-TPAT), Report on Seal Technologies, Jun. 14, 2002, 37 pages, vol. 7, Scott Smith, Harrison Consulting Group, LLC, National Cargo Security Council.
International Searching Authority, International Search Report and Written Opinion for International Application No. PCT/US2013/061833, dated Jan. 8, 2014, 9 pages, European Patent Office, The Netherlands.
U.S., Office Action for U.S. Appl. No. 14/036,811, dated Aug. 4, 2015, 21 pages, U.S.A.
U.S., Office Action for U.S. Appl. No. 14/036,811, dated Feb. 11, 2016, 12 pages, U.S.A.
Canadian Intellectual Property Office, Requisition by the Examiner for Application No. 2,886,380, dated May 24, 2016, 3 pages, Canada.
State Intellectual Property Office of the P.R.C., Office Action and Search Report (SR) for Application No. 201380063347.4, dated May 23, 2016, 11 pages, China.
U.S., Office Action for U.S. Appl. No. 14/036,811, dated May 20, 2016, 14 pages, U.S.A.
State Intellectual Property Office of the P.R.C., Office Action and Search Report (SR) for Application No. 201380063347.4, dated May 23, 2016, 6 pages, China.
U.S., Office Action for U.S. Appl. No. 14/036,811, dated Oct. 20, 2016, 18 pages, U.S.A.
Canadian Intellectual Property Office, Requisition by the Examiner for Application No. 2,886,380, dated Jan. 11, 2017, 4 pages, Canada.
State Intellectual Property Office of the P.R.C., Second Office Action for Application No. 201380063347.4, dated Feb. 17, 2017, 16 pages, China.
U.S., Office Action for U.S. Appl. No. 14/036,811, dated Mar. 15, 2017, 7 pages, U.S.A.
English Translation of CN Office Action dated Sep. 5, 2017 for CN Application No. 201380063347.
CN Office Action dated Sep. 5, 2017 for CN Application No. 201380063347.

* cited by examiner

CONCEPTS FOR ASSET IDENTIFICATION

CROSS-REFERENCE TO RELATED APPLICATIONS

This application claims priority to U.S. Provisional Application No. 61/713,330, filed Oct. 12, 2012, which is hereby incorporated herein in its entirety by reference.

BACKGROUND

Hours of valuable time are consumed everyday as transportation personnel contact dispatch, customs, checkpoint, or others regarding their arrival and departure to such areas. Such processes can cause reduced productivity as the vehicles must come to a complete stop and be turned off to allow the transportation employee to use a telephone to speak with appropriate personnel. This process causes additional wear to vehicle starters, ignitions, brakes as well as other mechanical components. The use of electronic and/or visual recognition of the vehicles and identifying features and/or personnel will increase vehicle throughput and personnel productivity as well as prevent bottlenecks at these areas and unnecessary wear on the vehicles.

BRIEF SUMMARY

In general, embodiments of the present invention provide methods, apparatus, systems, computing devices, computing entities, and/or the like for identifying an asset (e.g., a mobile asset or a personnel asset).

In accordance with one aspect, a method for identifying a mobile asset is provided. In one embodiment, the method comprises (1) transmitting a request to be received by a radio frequency identification (RFID) tag within a read range, the RFID tag affixed to a mobile asset; (2) after transmitting the request to be received by the RFID tag within the read range, receiving a response from the RFID tag, the response comprising a mobile asset identifier that uniquely identifies the mobile asset; (3) determining whether the mobile asset is authorized for one or more activities, the determination based at least in part on the mobile asset identifier; and (4) after a determination that the mobile asset is authorized for the one or more activities, generating an instruction to one or more perceivable indicators to initiate a perceivable indication that the mobile asset is authorized for the one or more activities.

In accordance with another aspect, a computer program product for identifying a mobile asset is provided. The computer program product may comprise at least one computer-readable storage medium having computer-readable program code portions stored therein, the computer-readable program code portions comprising executable portions configured to (1) transmit a request to be received by a radio frequency identification (RFID) tag within a read range, the RFID tag affixed to a mobile asset; (2) after transmitting the request to be received by the RFID tag within the read range, receive a response from the RFID tag, the response comprising a mobile asset identifier that uniquely identifies the mobile asset; (3) determine whether the mobile asset is authorized for one or more activities, the determination based at least in part on the mobile asset identifier; and (4) after a determination that the mobile asset is authorized for the one or more activities, generate an instruction to one or more perceivable indicators to initiate a perceivable indication that the mobile asset is authorized for the one or more activities.

In accordance with yet another aspect, an apparatus comprising at least one processor and at least one memory including computer program code is provided. In one embodiment, the at least one memory and the computer program code may be configured to, with the processor, cause the apparatus to (1) transmit a request to be received by a radio frequency identification (RFID) tag within a read range, the RFID tag affixed to a mobile asset; (2) after transmitting the request to be received by the RFID tag within the read range, receive a response from the RFID tag, the response comprising a mobile asset identifier that uniquely identifies the mobile asset; (3) determine whether the mobile asset is authorized for one or more activities, the determination based at least in part on the mobile asset identifier; and (4) after a determination that the mobile asset is authorized for the one or more activities, generate an instruction to one or more perceivable indicators to initiate a perceivable indication that the mobile asset is authorized for the one or more activities.

In accordance with one aspect, a method for identifying a mobile asset is provided. In one embodiment, the method comprises (1) receiving image data captured of an asset; (2) after capturing the image data of the asset, identifying the asset based at least in part on the captured image data; (3) determining whether the asset is authorized for one or more activities, the determination based at least in part on the identity of the asset; and (4) after a determination that the asset is authorized for the one or more activities, generating an instruction to one or more perceivable indicators to initiate a perceivable indication that the asset is authorized for the one or more activities.

In accordance with another aspect, a computer program product for identifying a mobile asset is provided. The computer program product may comprise at least one computer-readable storage medium having computer-readable program code portions stored therein, the computer-readable program code portions comprising executable portions configured to (1) receive image data captured of an asset; (2) after capturing the image data of the asset, identify the asset based at least in part on the captured image data; (3) determine whether the asset is authorized for one or more activities, the determination based at least in part on the identity of the asset; and (4) after a determination that the asset is authorized for the one or more activities, generate an instruction to one or more perceivable indicators to initiate a perceivable indication that the asset is authorized for the one or more activities.

In accordance with yet another aspect, an apparatus comprising at least one processor and at least one memory including computer program code is provided. In one embodiment, the at least one memory and the computer program code may be configured to, with the processor, cause the apparatus to (1) receive image data captured of an asset; (2) after capturing the image data of the asset, identify the asset based at least in part on the captured image data; (3) determine whether the asset is authorized for one or more activities, the determination based at least in part on the identity of the asset; and (4) after a determination that the asset is authorized for the one or more activities, generate an instruction to one or more perceivable indicators to initiate a perceivable indication that the asset is authorized for the one or more activities.

In accordance with yet another aspect, combinations of the various embodiments described above may be used together, such as combining the RFID and image-based concepts.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a diagram of a system that can be used to practice various embodiments of the present invention.

FIG. 2 includes a diagram of a data collection device that may be used in association with certain embodiments of the present invention.

FIGS. 5-7 show mobile assets and/or personnel assets (both referred to herein as assets) entering and exiting exemplary staging areas, customs areas, checkpoint areas, and/or the like.

DESCRIPTION

Figure 1:
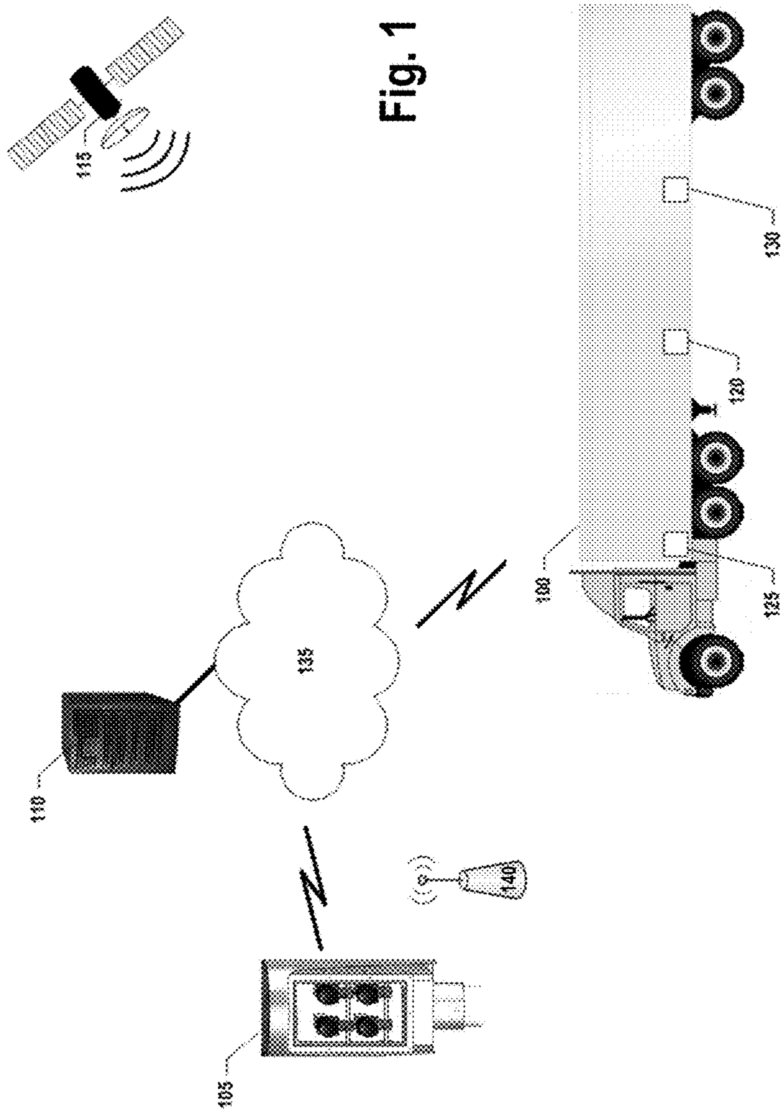

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

II. Exemplary System Architecture

The system may include one or more mobile assets 100, one or more imaging devices 105, one or more management systems 110, one or more Global Positioning System (GPS) satellites 115, one or more networks 135, one or more radio frequency identification (RFID) readers/interrogators 140, one or more perceivable indicators 145, one or more mobile devices 150, and/or the like. The mobile assets 100 may be operated by an operator, also referred to herein as a personnel asset. Thus, both mobile assets 100 and personnel assets are "assets." Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

a. Exemplary Mobile Asset

In various embodiments, a mobile asset 100 may be a tractor, a truck, a car, a motorcycle, a moped, a Segway, a trailer, a tractor and trailer combination, a van, a flatbed truck, a delivery vehicle, and/or any other form of vehicle. In one embodiment, each mobile asset 100 may be associated with a unique mobile asset identifier (such as a mobile asset ID) that uniquely identifies the mobile asset 100. The mobile asset 100 may be mobile in the sense that it may be able to move from one location to another under its own power. The unique mobile asset ID may include characters, such as numbers, letters, symbols, and/or the like. For example, an alphanumeric mobile asset ID (e.g., "1221A445533AS445") may be associated with each mobile asset 100. In another embodiment, the unique mobile asset ID may be the license plate, registration number painted or stickered on the mobile asset 100, or other identifying information assigned to and visible on the mobile asset 100. FIG. 1 represents an embodiment in which the mobile asset 100 is a tractor, a trailer, or a tractor and trailer combination.

Figure 2:
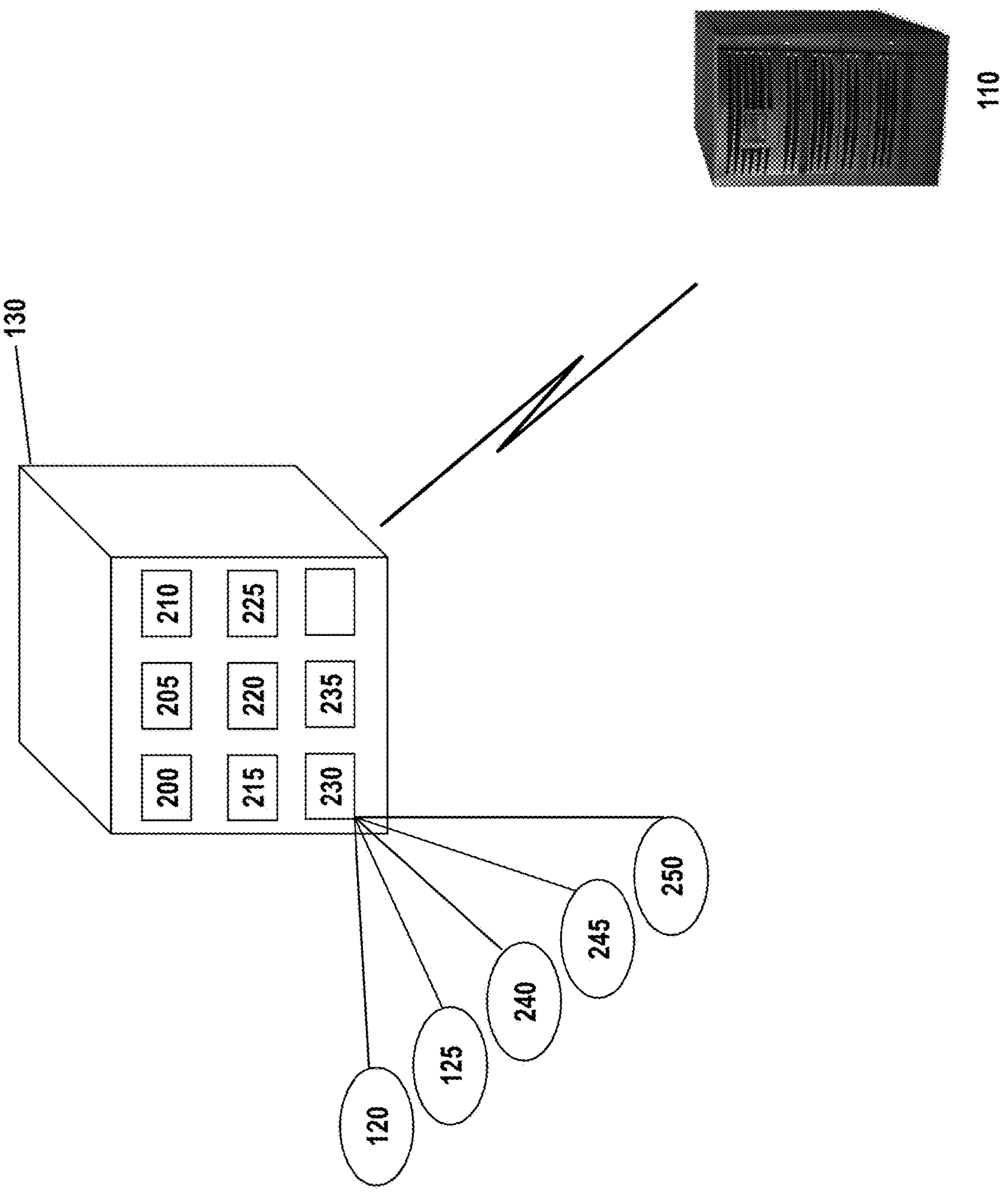

FIG. 1 shows one or more computing entities, devices, and/or similar words used herein interchangeably that are associated with the mobile asset 100, such as an information/data collection device 130 or other computing entities. FIG. 2 provides a block diagram of an exemplary information/data collection device 130 that may be attached, affixed, disposed upon, integrated into, or part of a mobile asset 100. The information/data collection device 130 may collect location and telematics information/data and transmit/send the information/data to the imaging device 105, the mobile device 150, and/or the management system 110 via one of several communication methods.

In one embodiment, the information/data collection device 130 may include, be associated with, or be in communication with one or more processors 200, one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving information/data from various sensors (e.g., via a CAN-bus), one or more communication ports 205 for transmitting/sending information/data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the mobile asset 100 (e.g., tractor and/or trailer) but external to the information/data collection device 130.

In one embodiment, the one or more location sensors 120 may be one of several components in communication with or available to the information/data collection device 130. Moreover, the one or more location sensors 120 may be compatible with a Low Earth Orbit (LEO) satellite system or a Department of Defense (DOD) satellite system. Alternatively, triangulation may be used in connection with a device associated with a particular mobile asset and/or the mobile asset's operator (e.g., personnel asset) and with various communication points (e.g., cellular towers or Wi-Fi access points) positioned at various locations throughout a geographic area to monitor the location of the mobile asset 100 (e.g., tractor and/or trailer) and/or its operator (e.g., personnel asset). The one or more location sensors 120 may be used to receive latitude, longitude, altitude, geocode, course, position, time, and/or speed information/data (e.g., location data). The one or more location sensors 120 may also communicate with the management system 110, the information/data collection device 130, and/or similar network entities.

As indicated, in addition to the one or more location sensors 120, the information/data collection device 130 may include and/or be associated with one or more telematics sensors 125. For example, the telematics sensors 125 may include mobile asset sensors, such as engine, fuel, odometer, hubometer, tire pressure, location, weight, emissions, door, and speed sensors. The telematics information/data may include, but is not limited to, speed information/data, emissions information/data, RPM information/data, tire pressure information/data, oil pressure information/data, seat belt usage information/data, distance information/data, fuel information/data, idle information/data, and/or the like. The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), ozone ($O_3$), hydrogen sulfide ($H_2S$) and/or ammonium ($NH_4$) information/data, and/or meteorological data.

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from mobile asset systems and sensors. The ECM 245 may further have information/data processing capability to collect and present mobile asset information/data to the J-Bus (which may allow transmission to the information/data collection device 130), and output standard mobile asset diagnostic codes when received from a mobile asset's J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the mobile asset 100 (e.g., tractor and/or trailer) in which the information/data collection device 130 is installed, specific to the geographic area in which the mobile asset 100 (e.g., tractor and/or trailer) will be traveling, and/or specific to the function the mobile asset 100 (e.g., tractor and/or trailer) serves within a fleet. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

In one embodiment, each mobile asset 100 may have an RFID tag/sensor attached or affixed thereto that stores the corresponding mobile asset ID. Such an RFID tag/sensor can be placed inside a mobile asset 100, or affixed to an outer surface of a mobile asset 100, for example. The RFID tags/sensors may be passive RFID tags/sensors, active RFID tags/sensors, semi-active RFID tags/sensors, battery-assisted passive RFID tags/sensors, and/or the like. Thus, the RFID tags/sensors can include some or all of the following components: one or more input interfaces for receiving information/data, one or more output interfaces for transmitting information/data, a processor, a clock, memory modules, and a power source.

In another embodiment, each mobile asset 100 may have its corresponding mobile asset ID visible on the exterior of the mobile asset 100. For example, the license plate number, registration number, alphanumeric characters, or other identifying information may be on the exterior of the mobile asset such that one or more imaging devices can capture an image of the mobile asset ID and properly identify it via analysis.

b. Exemplary Management System

Figure 3:
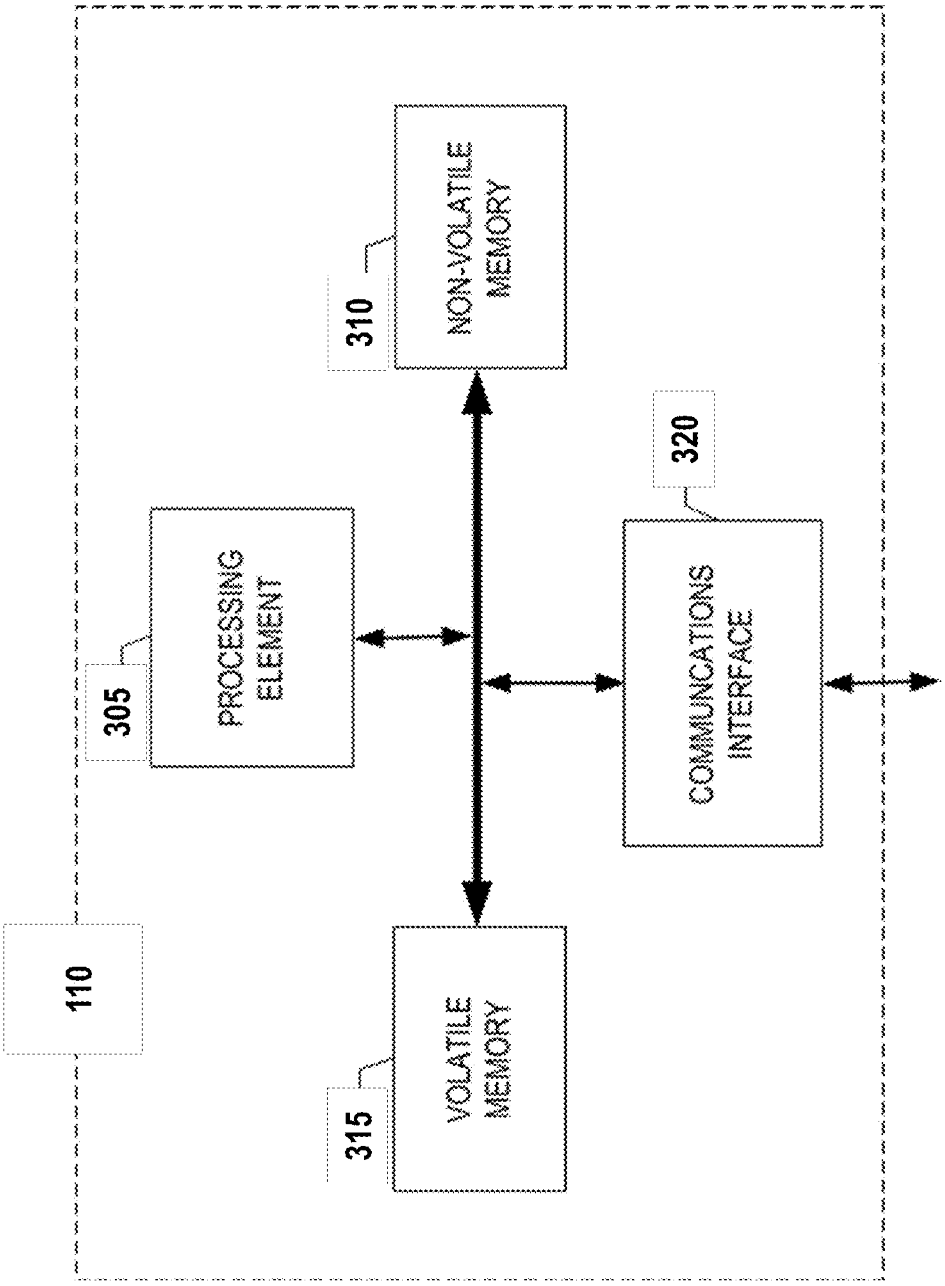
FIG. 3 is a schematic of a management system in accordance with certain embodiments of the present invention.

FIG. 3 provides a schematic of a management system 110 according to one embodiment of the present invention. In general, the term system may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management system 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management system 110 may communicate with mobile assets 100, imaging devices 105, RFID interrogators/readers 140, perceivable indicators 145, mobile devices 150, and/or the like.

As shown in FIG. 3, in one embodiment, the management system 110 may include or be in communication with one or more processing elements 305 (also referred to as processors, processing circuitry, and/or similar terms used herein interchangeably) that communicate with other elements within the management system 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the management system 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The term database, database instance, database management system, and/or similar terms used herein interchangeably may refer to a structured collection of records or information/data that is stored in a computer-readable storage medium, such as via a relational database, hierarchical database, and/or network database.

In one embodiment, the management system 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 305. Thus, the databases, database instances, database management systems, information/data, applications, programs, program modules, scripts, source code, object code, byte code, compiled code, interpreted code, machine code, executable instructions, and/or the like may be used to control certain aspects of the operation of the management system 110 with the assistance of the processing element 305 and operating system.

As indicated, in one embodiment, the management system 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the management system 110 may communicate with computing entities or communication interfaces of the mobile asset 100 (e.g., tractor and/or trailer), the imaging devices 105, RFID interrogators/readers 140, perceivable indicators 145, mobile devices 150, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the management system 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the management system 110 may include or be in communication with one or more input elements, such as a keyboard input, a mouse input, a touch screen/display input, audio input, pointing device input, joystick input, keypad input, and/or the like. The management system 110 may also include or be in communication with one or more output elements (not shown), such as audio output, video output, screen/display output, motion output, movement output, and/or the like.

As will be appreciated, one or more of the management system's 110 components may be located remotely from other management system 110 components, such as in a distributed system. Furthermore, one or more of the components may be combined and additional components performing functions described herein may be included in the management system 110. Thus, the management system 110 can be adapted to accommodate a variety of needs and circumstances.

c. Exemplary Mobile Device

Figure 4:
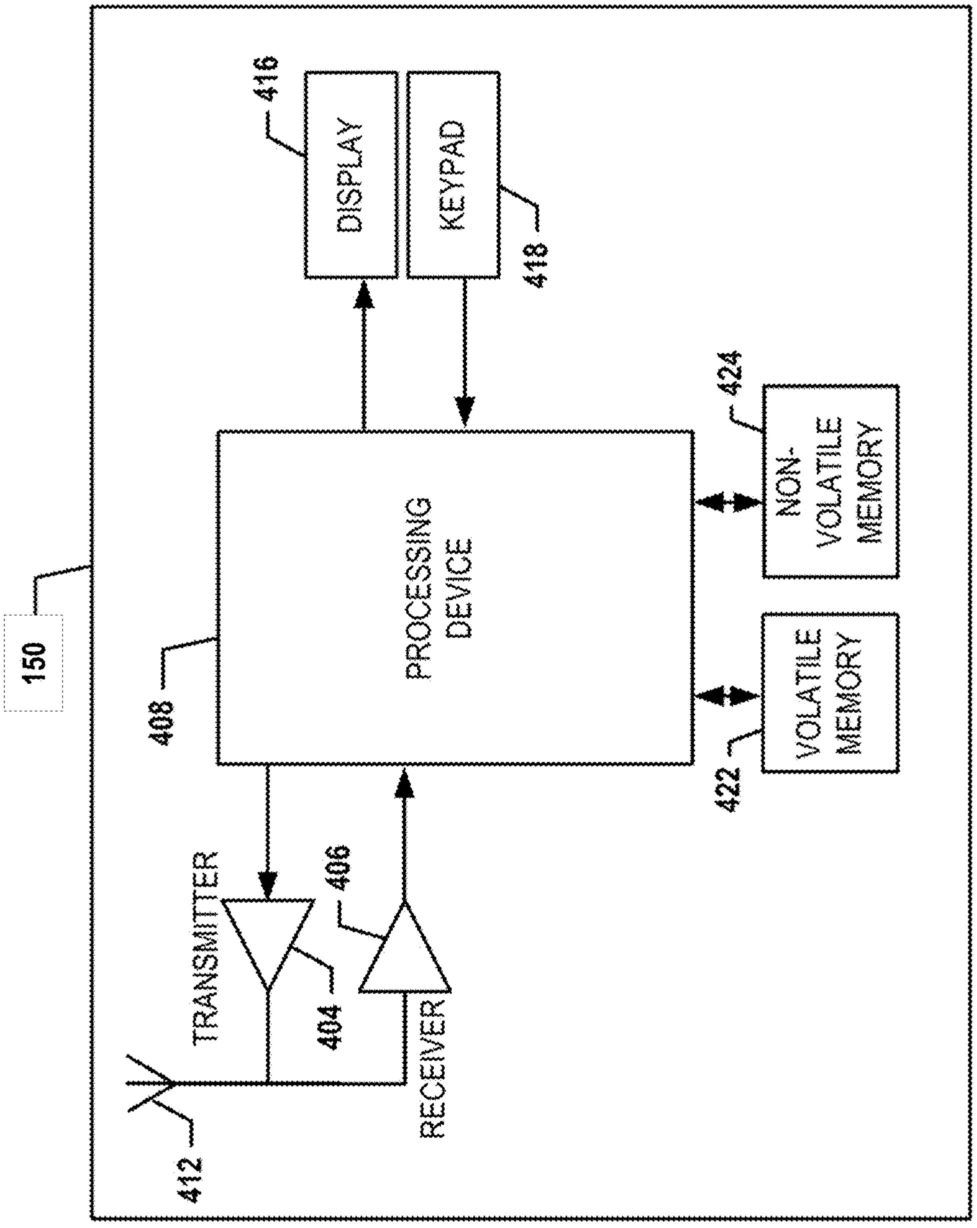
FIG. 4 is a schematic of a mobile device in accordance with certain embodiments of the present invention.

FIG. 4 provides an illustrative schematic representative of a mobile device 150 (e.g., a mobile computing entity) that can be used in conjunction with embodiments of the present invention. The device is mobile in the sense that it can be easily moved from one location to another. Mobile devices 150 can be operated by various parties, including operators of mobile assets 100 (e.g., personnel assets). As shown in FIG. 4, the mobile device 150 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as mobile assets 100, imaging devices 105, management system 110, RFID interrogators/readers 140, perceivable indicators 145, and/or the like. In this regard, the mobile device 150 may be capable of operating with one or more air interface standards, communication protocols, modulation types, and access types. More particularly, the mobile device 150 may operate in accordance with any of a number of wireless communication standards and protocols. In a particular embodiment, the mobile device 150 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 150 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile device 150 can also download changes, add-ons, and updates, for instance, to its firmware, software (e.g., including executable instructions, applications, program modules), and operating system.

According to one embodiment, the mobile device 150 may include a location determining device and/or functionality. For example, the mobile device 150 may include a GPS module adapted to acquire, for example, latitude, longitude, altitude, geocode, course, and/or speed data. In one embodiment, the GPS module acquires information/data, sometimes known as ephemeris information/data, by identifying the number of satellites in view and the relative positions of those satellites.

The mobile device 150 may also comprise a user interface (that can include a display 416 coupled to a processing element 408) and/or a user input interface (coupled to a processing element 408). The user input interface can comprise any of a number of devices allowing the mobile device 150 to receive information/data, such as a keypad 418 (hard or soft), a touch display, voice or motion interfaces, or other input device. In embodiments including a keypad 418, the keypad 418 can include (or cause display of) the conventional numeric (0-9) and related keys (#, *), and other keys used for operating the mobile device 150 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 150 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the mobile device 150.

d. Exemplary Imaging Devices

Embodiments of the present invention may also include one or more imaging devices 105 positioned at staging areas, customs areas, checkpoint areas, and/or the like. An imaging device 105 may include one or more cameras, one or more laser scanners, one or more infrared scanners, one or more imagers, one or more video cameras, one or more still cameras, one or more Internet Protocol (IP) cameras, one or more traffic cameras, and/or the like. Such imaging devices 105 may be include one or more wide angle lenses and/or one or more narrow angle lenses. The imaging devices 105 may also include one or more processors and one or more temporary memory storage areas, such as circular buffers. Thus, the imaging devices 105 can capture images (e.g., image data) and store them temporarily in the temporary memory storage area or permanently (in a separate memory storage area) within the imaging devices 105. In one embodiment, the imaging devices 105 may also be connected to (or include) one or more network interfaces (e.g., wired or wireless) for communicating with various computing entities. This communication may be via the same or different wired or wireless networks using a variety of wired or wireless transmission protocols. This may allow the imaging devices to transmit/send images (e.g., image data) they capture.

Figure 6:
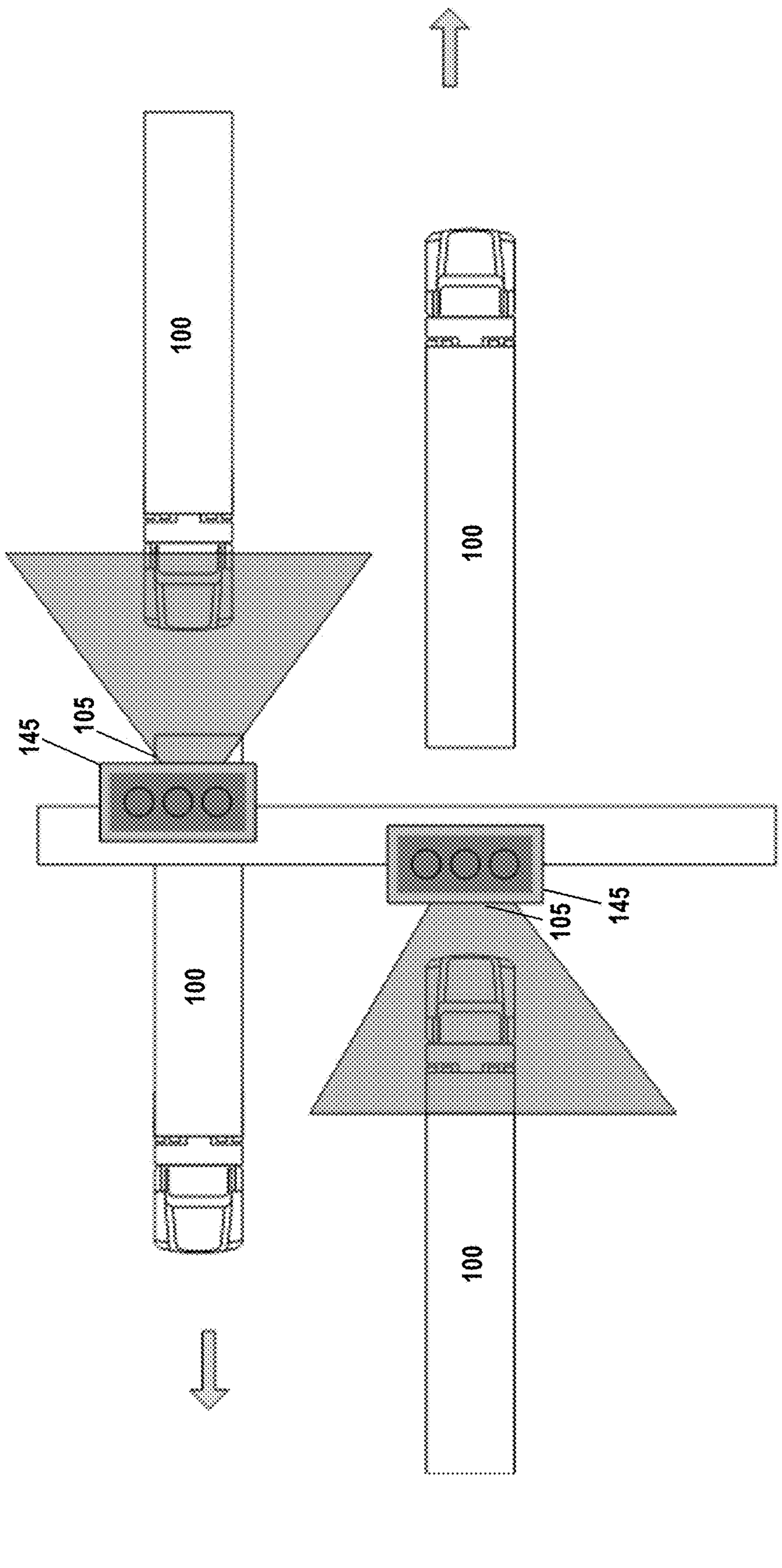
Figure 7:
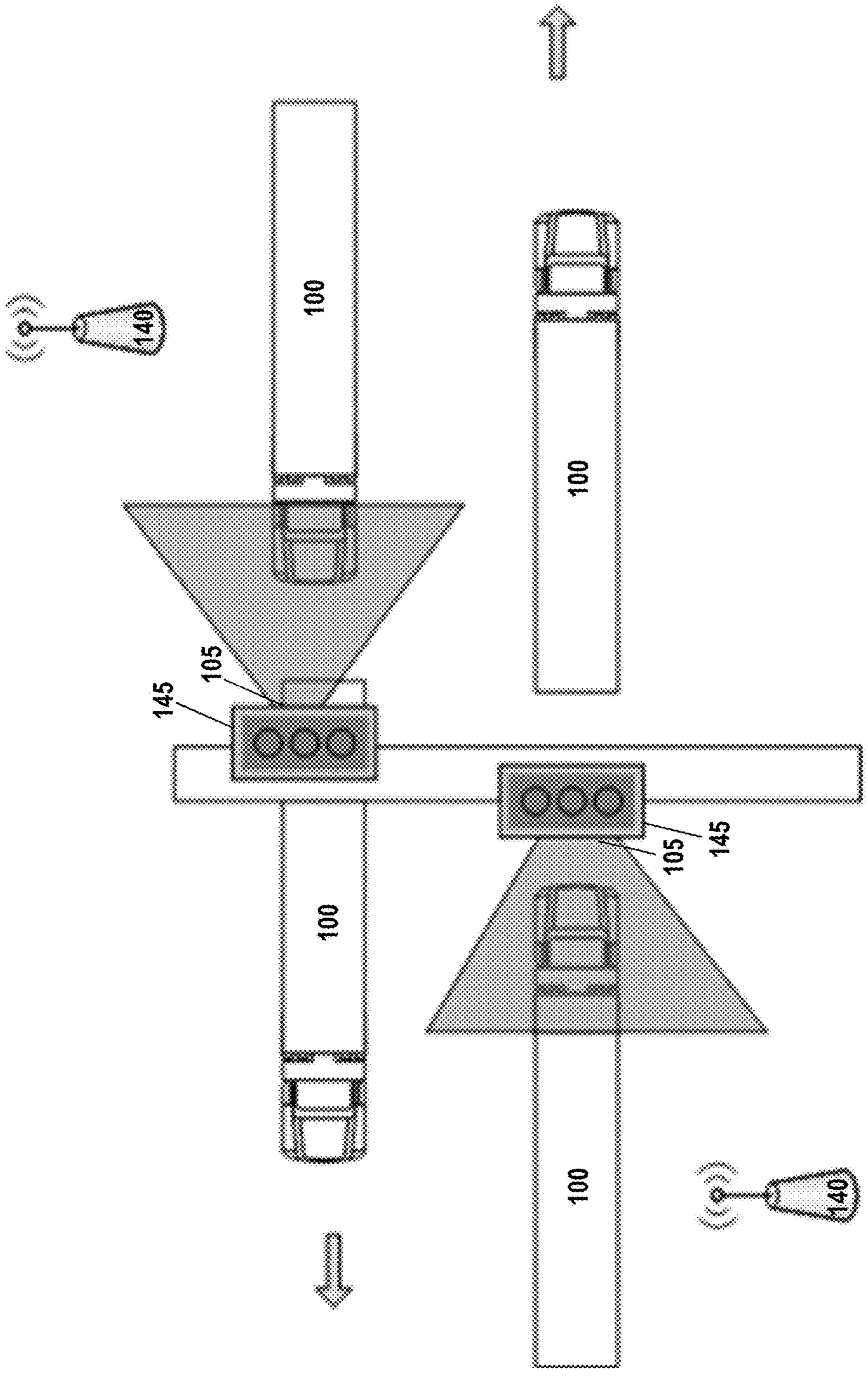

In one embodiment, the imaging devices 105 can be positioned to capture image data in zones of interest at staging areas, customs areas, checkpoint areas, and/or the like. Exemplary zones of interest are shown in FIGS. 6 and 7. The imaging data captured by the imaging devices 105 in the zones of interest may include (as determined from analysis) a mobile asset ID, image of driver's faces (for use in facial recognition), and/or the like. The number of imaging devices 105 used may vary based on the desired configuration. For example, in one embodiment, each lane of traffic may be monitored by a single imaging device 105 with a narrow angle lens. Such a configuration may allow for an imaging device 105 to capture images of the licenses plates (or other mobile asset IDs) of the mobile assets 100 traveling in the respective lanes of traffic. In another embodiment, an imaging device 105 with a wide angle lens can be used to monitor, for example, multiple lanes of traffic.

The resolution of the images (e.g., image data) captured by the imaging device 105 may be, for instance, 640 pixels by 480 pixels or higher. In one embodiment, for night operation, the imaging devices 105 may have a sensitivity of 0.5 lux or better at an optical stop equivalent of F1. Further, the imaging devices 105 may include or be used in association with various lighting, such as light emitting diodes (LEDs), Infrared lights, array lights, strobe lights, and/or other lighting mechanisms to sufficiently illuminate the zones of interest to capture image data for analysis. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like.

The imaging devices 105 may also be connected to (or include) a network interface (e.g., the wireless Ethernet bridge) for communicating with various computing entities. In one embodiment, the imaging devices 105 can communicate with the management system 110 using protocols and stacks, such as sockets. The network interface may provide the ability for each imaging device 105 to serve as a web host with, for example, web pages that can be used to setup and configure the imaging devices 105. Moreover, via the web pages (or via the management system 110), the imaging devices 105 can provide a live view of the zones of interest, which can be used to aim and focus the imaging devices 105. This may also provide the functionality of controlling the exposure, gain, gamma, white balance, compression, and numerous other attributes of the imaging devices 105. Thus, via the network interface, the imaging devices 105 may provide access for a user to (a) remotely configure (e.g., control the exposure, gain, gamma, and white balance of the images) the imaging devices 105; (b) remotely access captured images; or (c) synchronize the time on the imaging devices 105 to a consistent network time.

e. RFID Readers/Interrogators

Embodiments of the present invention may also use one or more RFID readers/interrogators 140 positioned at staging areas, customs areas, checkpoint areas, and/or the like. As will be recognized, the one or more RFID readers/interrogators 140 may be used to extract information/data stored or collected by the RFID tags/sensors (such as mobile asset IDs) affixed to mobile assets 100. For example, the one or more RFID readers/interrogators 140 can transmit/send a signal (e.g., a radio frequency (RF) signal) that prompts and/or powers RFID tags/sensors affixed to mobile assets 100 within a geographical range (e.g., a read range) to provide information/data from the memory of the tags/sensors to the appropriate computing entity or communication interface of the one or more RFID readers/interrogators 140.

As will be recognized, the read range may vary based on the particular technology being used. For example, in an embodiment using Bluetooth, the read range of a computing entity (e.g., imaging device 105 or computing entity or communication interface associated with a mobile asset 100) transmitting/sending a Bluetooth signal/request may be up to 30 feet (whereas a Wi-Fi may provide a read range of 100-300 feet). Thus, RFID tags/sensors within that 30-foot read range may receive the signal/request. Other technologies and protocols may reduce or increase the read range. These technologies and protocols include GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, USB protocols, and/or any other wireless protocol. In addition to interrogating/reading RFID tags/sensors, these communication capabilities may enable the one or more RFID readers/interrogators 140 to communicate with mobile assets 100, imaging devices 105, management systems 110, perceivable indicators 145, mobile devices 150, and/or the like.

In one embodiment, the one or more RFID readers/interrogators 140 can transmit/send a signal/request (to be received by RFID tags/sensors within the read range) on a periodic, continuous, regular basis or in response to certain triggers. For example, in one embodiment, the one or more RFID readers/interrogators 140 can transmit/send a signal/request to be received by RFID tags/sensors within the read range every 5 seconds, every 10 seconds, every 60 seconds, every 10 minutes, every 60 minutes, and/or the like. In another embodiment, the one or more RFID readers/interrogators 140 can transmit/send a signal/request to be received by RFID tags/sensors within the read range in response to certain triggers, such as a mobile asset 100 entering or exiting a geofenced area associated with a staging area, customs area, checkpoint area, and/or the like. As will be recognized, a variety of other approaches and techniques may be used to adapt to various needs and circumstances.

f. Perceivable Indicators

Embodiments of the present invention may also use one or more perceivable indicators 145 positioned at staging areas, customs areas, checkpoint areas, and/or the like. A perceivable indicator 145 may be one or more stop lights (e.g., with red, yellow, and green lights), a beacon (e.g., a light that flashes), and/or one or more audible sound generators (e.g., that generate a honking, bell, or alarm sound). A perceivable indicator may also be one or more message boards (such as liquid crystal display (LCD) or light-emitting diode (LED) message boards) that provide specific instructions, such as dock number, safety tip, road closure information, traffic alert, and/or weather related information, and/or the like. A perceivable indicator 145 may also be a locking gate or boom barrier gate with an appropriate engagement or retraction. Accordingly, in addition to providing a perceivable indication, the perceivable indicator 145 may also provide an obstacle for preventing access to or from staging areas, customs areas, checkpoint areas, and/or the like.

In one embodiment, the perceivable indications provided or generated by the one or more perceivable indicators 145 may be initiated and/or terminated by receiving instructions from an appropriate computing entity, such as RFID readers/interrogators 140, mobile assets 100, imaging devices 105, management systems 110, mobile devices 150, and/or the like. Such instructions may be received using a variety of wired or wireless technologies and protocols, including FDDI, DSL, Ethernet, ATM, frame relay, DOCSIS, or any other wired transmission protocol, GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, USB protocols, and/or any other wireless protocol.

III. Exemplary System Operation

Figure 5:
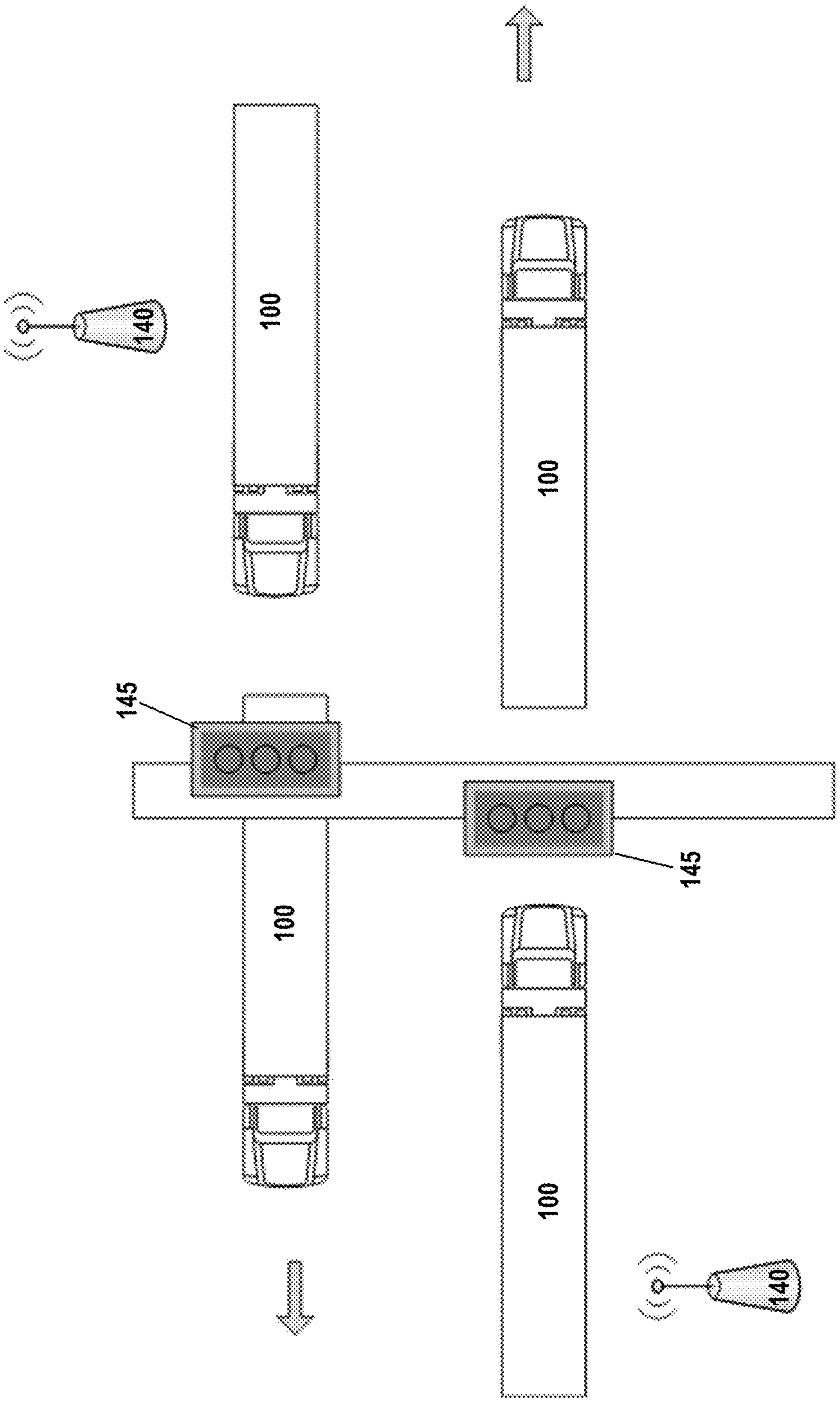
Figure 8:
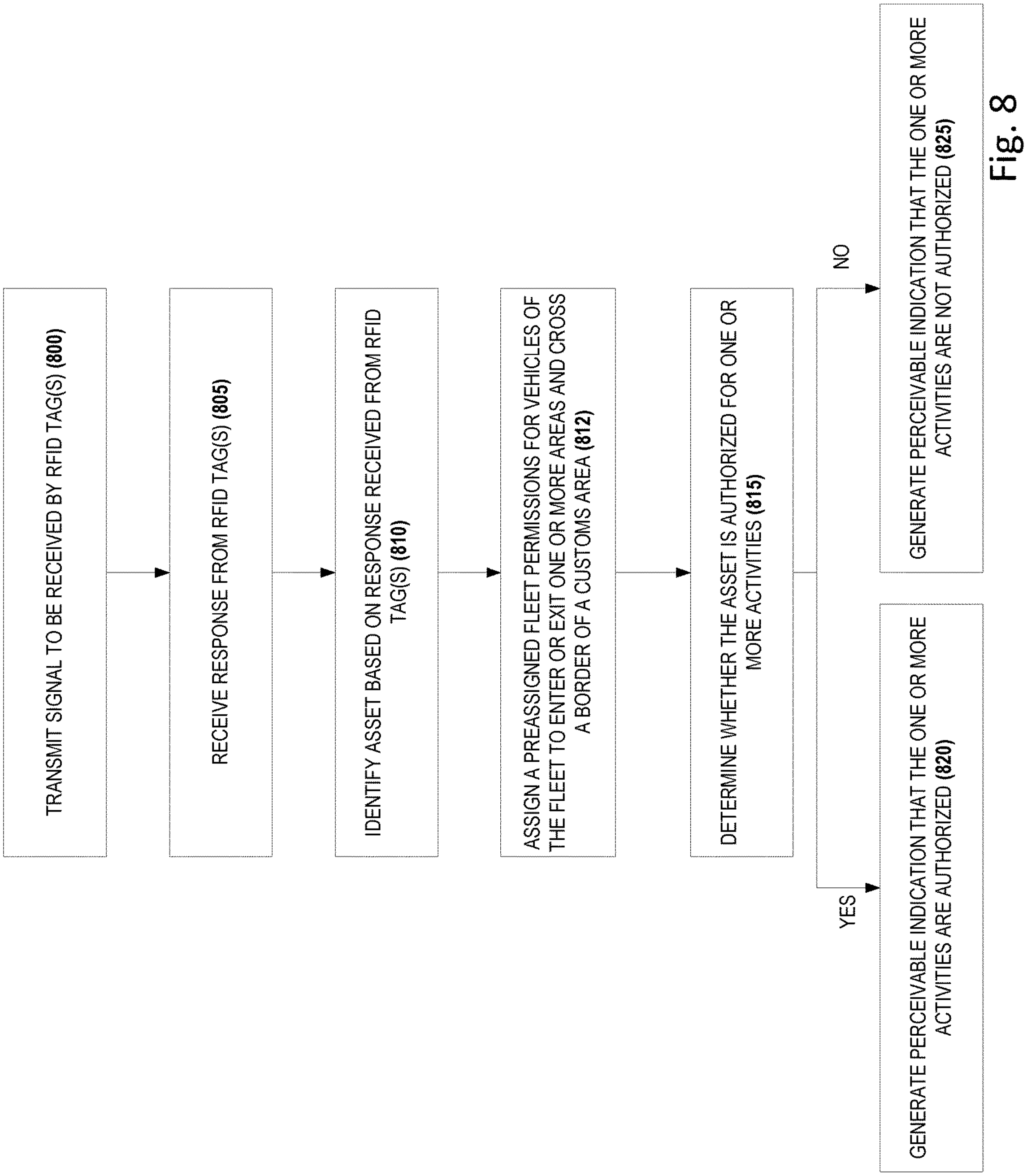
FIGS. 8-9 are flowcharts illustrating operations and processes that can be used in accordance with various embodiments of the present invention.
Figure 9:
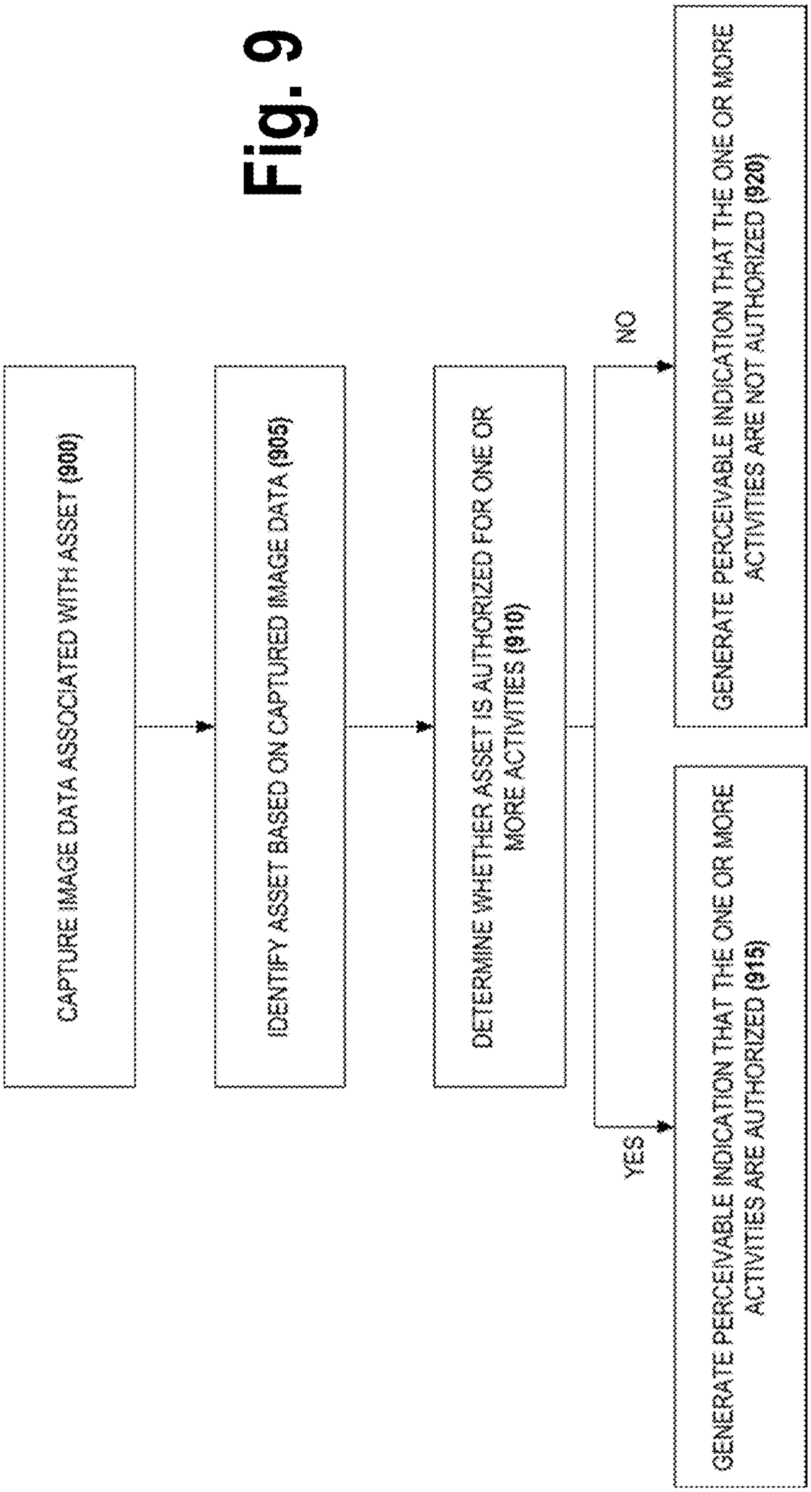

Reference will now be made to FIGS. 5-9. FIGS. 5-7 show mobile assets 100 entering and exiting exemplary staging areas, customs areas, checkpoint areas, and/or the like. FIGS. 8 and 9 are flowcharts illustrating operations and processes that can be used in accordance with various embodiments of the present invention.

a. RFID-Based Approach

In one embodiment, an appropriate computing entity (e.g., an RFID reader/interrogator 140 or other entity such as an imaging device 105, a management system 110, a mobile device 150, and/or the like) can transmit/send a signal/request to be received by RFID tags/sensors within the read range (see FIG. 5). The signal/request can be transmitted/sent on a periodic, continuous, or regular basis or in response to certain triggers. In one embodiment, to do so, this approach may require that the mobile asset 100 be traveling a predetermined speed, below a predetermined speed, or stopped. This may also involve having the appropriate computing entity (e.g., an RFID reader/interrogator 140 or other entity such as an imaging device 105, a management system 110, a mobile device 150, and/or the like) positioned at the entrance and/or exits of staging areas, customs areas, checkpoint areas, and/or the like.

1. Periodic, Continuous, or Regular Transmission of Signal

As indicated in Block 800 of FIG. 8, an appropriate computing entity (e.g., an RFID reader/interrogator 140 or other entity such as an imaging device 105, a management system 110, a mobile device 150, and/or the like) can transmit/send a signal/request to be received by RFID tags/sensors within the computing entity's read range on a periodic, continuous, or regular basis. For example, in one embodiment, an appropriate computing entity (e.g., an RFID reader/interrogator 140 or other entity such as an imaging device 105, a management system 110, a mobile device 150, and/or the like) can transmit/send a signal/request to be received by RFID tags/sensors within the computing entity's read range every 5 seconds, every 10 seconds, every 60 seconds, every 10 minutes, every 60 minutes, and/or the like.

As previously noted, the read range may vary based on the particular technology being used. For example, in an embodiment using Bluetooth, the read range of a computing entity (e.g., an RFID reader/interrogator 140 or other entity such as an imaging device 105, a management system 110, a mobile device 150, and/or the like) transmitting/sending a Bluetooth signal/request may be up to 30 feet. In an embodiment using WiFi, the read range of a computing entity (e.g., an RFID reader/interrogator 140 or other entity such as an imaging device 105, a management system 110, a mobile device 150, and/or the like) transmitting/sending a WiFi signal/request may be between 100-300 feet. Other technologies and protocols may reduce or increase the read range. These technologies and protocols include GPRS, UMTS, CDMA2000, 1×RTT, WCDMA, TD-SCDMA, LTE, E-UTRAN, EVDO, HSPA, HSDPA, WiMAX, UWB, IR protocols, USB protocols, and/or any other wireless protocol.

2. Geofence-Based Transmission of Signal

As indicated in Block 800 of FIG. 8, an appropriate computing entity (e.g., an RFID reader/interrogator 140 or other entity such as an imaging device 105, a management system 110, a mobile device 150, and/or the like) can transmit/send a signal/request to be received by RFID tags/sensors within the computing entity's read range in response to certain triggers. For example, in one embodiment, an appropriate computing entity (e.g., an RFID reader/interrogator 140 or other entity such as an imaging device 105, a management system 110, a mobile device 150, and/or the like) can transmit/send a signal/request to be received by RFID tags/sensors within the computing entity's read range in response to (e.g., after) a determination that the mobile asset 100 entered or exited a geofenced area corresponding to, for example, a staging area, customs area, checkpoint area, and/or the like. Such an embodiment is described below.

i. Geographic Areas

In one embodiment, geographic areas may correspond to countries, regions, states, counties, cities, towns, and/or the like. As will be recognized, geographic areas may also correspond to private or public land areas, staging areas, customs areas, checkpoint areas, and/or the like. According to various embodiments of the present invention, a geographic area may overlap or reside wholly within another geographic area. According to various embodiments, the geographic areas need not be continuous. In other words, a geographic area may specifically exclude an area that would otherwise fall within the geographic area (e.g., such that the geographic area forms a donut or other shape around the excluded area).

ii. Defined Geofences

Map vendors, such as Tele Atlas® and NAVTEQ®, provide digitized or electronic maps to a variety of clients for different purposes. For example, such companies may provide digitized maps to: (a) Internet websites for providing driving directions to consumers; (b) cellular companies to include in phones and personal digital assistants; (c) government agencies (e.g., the United States Department of Agriculture and Environmental Protection Agency) for use in their respective government functions; (d) transportation and logistics companies; and (e) various other entities for a variety of reasons.

In one embodiment, using such digitized or electronic maps, a computing entity (e.g., the data collection device 130, imaging device 105, mobile device 150, and/or management system 110) may be used to define one or more geofences. The geofences may be defined to surround private or public land areas, staging areas, customs areas, checkpoint areas, and/or the like. Such geofences may be defined, for example, by the latitude and longitude coordinates associated with various points along the perimeter of the geographic areas. Alternatively, geofences may be defined based on latitude and longitude coordinates of the center, as well as the radius, of the geographic areas. The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention.

iii. Transmission of Signal

In one embodiment, once at least one geofence has been defined, the coordinates (or similar methods for defining the geofenced areas) may be stored in a database associated with, for example, the RFID readers/interrogators 140, imaging devices 105, management systems 110, mobile devices 150, and/or the like, the estimated location of the mobile asset 100 (e.g., tractor and/or trailer) or mobile device 150 can trigger/initiate certain events based on the mobile asset's 100 or mobile device's 150 estimated location. For instance, entering and/or exiting a geofenced area may be used to cause an appropriate computing entity (e.g., an RFID reader/interrogator 140 or other entity such as an imaging device 105, a management system 110, a mobile device 150, and/or the like) to transmit/send a signal/request to be received by RFID tags/sensors within the computing entity's read range in response to entering or exiting a geofenced area.

Operatively, the estimated location of a mobile asset 100 (e.g., tractor and/or trailer) or a mobile device 150 can be monitored and/or determined on a regular, continuous, or periodic basis or in response to certain triggers. Generally, the estimated location of a mobile asset 100 (e.g., tractor and/or trailer) or a mobile device 150 can be monitored by any of a variety of computing entities, including the data collection device 130, the mobile device 150, the management system 110, and/or any other appropriate computing entity. For example, as noted above, the mobile asset's 100 (or the mobile device's 150) estimated location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network).

In one embodiment, by using the mobile asset's 100 estimated location, a computing entity (data collection device 130, RFID readers/interrogators 140, imaging devices 105, management systems 110, mobile devices 150, and/or the like) can determine, for example, when the mobile asset 100 enters a defined geofence (e.g., a geofenced area). In one embodiment, in response to (e.g., after) a determination that a mobile asset 100 has entered a defined geofenced area, an appropriate computing entity (e.g., RFID readers/interrogators 140, imaging devices 105, management systems 110, mobile devices 150, and/or the like) can transmit/send a signal/request to be received by RFID tags/sensors within the computing entity's read range once or on a periodic, continuous, or regular basis while within the geofenced area. After the mobile asset 100 (e.g., tractor and/or trailer) has entered the geofenced area, the estimated location of the mobile asset 100 can continue to be monitored by any of a variety of computing entities. By using the mobile asset's 100 estimated location, a computing entity can determine, for example, when the mobile asset 100 (e.g., tractor and/or trailer) exits the defined geofenced area, which may trigger the appropriate computing entity to cease transmission of the signals/requests.

In another embodiment, by using the mobile asset's 100 estimated location, a computing entity (data collection device 130, RFID readers/interrogators 140, imaging devices 105, management systems 110, mobile devices 150, and/or the like) can determine, for example, when the mobile asset 100 exits a defined geofence (e.g., a geofenced area). In one embodiment, in response to (e.g., after) a determination that a mobile asset 100 has exited a defined geofenced area, an appropriate computing entity (e.g., RFID readers/interrogators 140, imaging devices 105, management systems 110, mobile devices 150, and/or the like) can transmit/send a signal/request to be received by RFID tags/sensors within the computing entity's read range once or on a periodic, continuous, or regular basis while outside the geofenced area. After the mobile asset 100 (e.g., tractor and/or trailer) has exited the geofenced area, the estimated location of the mobile asset 100 can continue to be monitored by any of a variety of computing entities. By using the mobile asset's 100 estimated location, a computing entity can determine, for example, when the mobile asset 100 (e.g., tractor and/or trailer) enters the defined geofenced area, which may trigger the appropriate computing entity to cease transmission of the signals/requests.

As previously noted, the read range may vary based on the particular technology being used. For example, in an embodiment using Bluetooth, the read range of a computing entity (e.g., an RFID reader/interrogator 140 or other entity such as an imaging device 105, a management system 110, a mobile device 150, and/or the like) transmitting/sending a Bluetooth signal/request may be up to 30 feet. In an embodiment using WiFi, for example, the read range of a computing entity (e.g., an RFID reader/interrogator 140 or other entity such as an imaging device 105, a management system 110, a mobile device 150, and/or the like) transmitting/sending a WiFi signal/request may be between 100-300 feet. Other technologies and protocols may reduce or increase the read range, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, USB protocols, and/or any other wireless protocol.

3. Receipt of Mobile Asset ID from RFID Tag/Sensor

In one embodiment, as indicated in Block 805 of FIG. 8, in response to (e.g., after) an appropriate computing entity (e.g., an RFID reader/interrogator 140 or other entity such as an imaging device 105, a management system 110, a mobile device 150, and/or the like) transmitting/sending a signal/request to be received by RFID tags/sensors within the computing entity's read range, RFID tags/sensors within the read range can receive the signal/request. In some embodiments, receipt of the signal/request can be sufficient to power RFID tags/sensors to transmit/send responses to the signal/request. In other embodiments, the RFID tags/sensors may include a power source such that the RFID tags/sensors can transmit/send responses to the signal/request based on their own power. In any case, RFID tags/sensors that receive the signal/request can transmit/send a response to the appropriate computing entity.

In one embodiment, the responses from the RFID tags/sensors may include minimal information. For example, each RFID tag/sensor within the read range may transmit/send a response that includes the mobile asset ID for the mobile asset 100 to which it is affixed. By way of example, an RFID tag/sensor affixed to a mobile asset 100 assigned mobile asset ID 1221A445533AS445 may respond to the signal/request by transmitting/sending a response with its mobile asset ID (1221A445533AS445).

In one embodiment, the appropriate computing entity (e.g., an RFID reader/interrogator 140 or other entity such as an imaging device 105, a management system 110, a mobile device 150, and/or the like) can receive the responses transmitted/sent by the RFID tags/sensors within its read range. Continuing with the above example, the appropriate computing entity (e.g., e.g., an RFID reader/interrogator 140 or other entity such as an imaging device 105, a management system 110, a mobile device 150, and/or the like) can receive a response with mobile asset ID 1221A445533AS445.

After receiving such a response, the response can be transmitted/sent to the appropriate computing entity (e.g., management system 110 or other entity including the perceivable indicator 145). With the response, the appropriate computing entity (e.g., management system 110) can identify the mobile asset ID (e.g., 1221A445533AS445) based on the response (Block 810 of FIG. 8) and assign a fleet of vehicles permissions to enter or exit areas and cross a border of a customs area (Block 812 of FIG. 8) and make any necessary determinations and perform any desired actions (Block 815 of FIG. 8). Such determinations may include determining whether the mobile asset ID corresponds to a mobile asset 100 (*a*) within a specific fleet of mobile assets 100, (b) with certain permissions or privileges, (c) that is authorized to cross a border, (d) that is authorized to enter or exit a staging area or checkpoint, (e) that has been properly inspected, (f) that is under a specified weight, (g) with a properly captured mobile asset ID, (h) to initiate generation of electronic preclearance documents for customs officials, and/or the like. Based on the determination, the appropriate computing entity can transmit/send an instruction to one or more perceivable indicators 145 to initiate or terminate a perceivable indication. For example, in response to (e.g., after) the management system 110 determining that a mobile asset's 100 mobile asset ID has been properly captured, the management system 110 can transmit an instruction to the appropriate perceivable indicators 145 to provide or generate a perceivable indication. In another example, in response to (e.g., after) the management system 110 determining that a mobile asset 100 associated with mobile asset ID is or is not authorized to enter or exit a staging area, checkpoint area, or customs area, the management system 110 can transmit an instruction to the appropriate perceivable indicators 145 to provide or generate a perceivable indication.

4. Generate Perceivable Indication

In one embodiment, the one or more perceivable indicators 145 can receive the instruction to initiate or terminate a perceivable indication. The perceivable indicators 145 may then provide or generate the corresponding perceivable indications (Blocks 820 and 825 of FIG. 8), such as changing a red light to a green light on a stop light, flashing the lights on a beacon, generating a specific sound, provide visual instructions, lock or unlock and/or open or close a gate, raise or lower a boom barrier gate, and/or the like. Such perceivable indications may be used to provide notice to the operator of the mobile asset 100 (e.g., personnel asset) that he or she can or cannot proceed or perhaps take other actions. As will be recognized, a variety of other approaches and techniques may also be used.

Additionally, the appropriate computing entity (e.g., imaging device 105, management system 110, RFID reader/interrogator 140, perceivable indicator 145, mobile device 150, and/or the like) can generate notifications for other entities to log the movement of mobile assets 100 and/or personnel. This may aid in preparing the appropriate documentation for customs clearances well in advance of the mobile asset 100, for example, crossing a border. As will be recognized, a variety of other approaches and techniques can be used to adapt to various needs and circumstances.

b. Image-Based Approach

In one embodiment, imaging devices 105 can be positioned to capture image data in zones of interest at staging areas, customs areas, checkpoint areas, and/or the like. The imaging devices 105 may be positioned at the entrance and/or exits of such areas. Exemplary zones of interest are shown in FIGS. 6 and 7. In one embodiment, to sufficiently capture image data, this approach may require that the mobile asset 100 be traveling a predetermined speed, below a predetermined speed, or stopped.

1. Capture of Image Data

In one embodiment, image data for assets (e.g., mobile assets and/or personnel assets) may be captured by an imaging device. For example, each lane of traffic may be captured by a single imaging device 105 with a narrow angle lens (Block 900 of FIG. 9). Such a configuration may allow for an imaging device 105 to capture image data of the mobile assets 100 and operators (e.g., personnel assets) in a single lane of traffic. In another embodiment, an imaging device 105 with a wide angle lens can be used to capture image data for multiple lanes of traffic and corresponding mobile assets 100 and operators (e.g., personnel assets) (Block 900 of FIG. 9). The captured image data may be in a variety of formats, such as JPEG, MJPEG, MPEG, GIF, PNG, TIFF, BMP, H.264, H.263, FLV, HTML5, VP6, VP8, and/or the like.

2. Analysis of Image Data

After an imaging device 105 captures the appropriate image data, the image data can be transmitted/sent to the appropriate computing entity (e.g., management system 110 or other entity including the perceivable indicator 145). With the image data, the appropriate computing entity (e.g., management system 110) can analyze the image data to identify various information therein (Block 905 of FIG. 9), such as mobile asset IDs captured from the exterior of mobile assets 100. For instance, based at least in part on the image data, the appropriate computing entity (e.g., management system 110) can identify the mobile asset IDs corresponding to the mobile asset 100 captured in the image data (Block 905 of FIG. 9). This may include identifying alphanumeric characters in the image data that represent the mobile asset ID, such as by using various optical character recognition (OCR) techniques. Additionally or alternatively, the appropriate computing entity (e.g., management system 110) can analyze the image data to identify the operator of the mobile asset 100 (e.g., personnel asset) based on his or her facial features (Block 905 of FIG. 9). To do so, the appropriate computing entity (e.g., management system 110) may employ facial recognition techniques (in coordination with a facial database, for example). This may involve identifying the face of the personnel asset (e.g., operator) by extracting landmarks or features from the image data of the personnel asset's face (e.g., operator's face). This may also include analyzing the relative position, size, and/or shape of the eyes, nose, cheekbones, and jaw. Further, the facial recognition software may employ a variety of techniques to identify personnel assets (e.g., operators), including geometric approaches, photometric approaches, three dimensional approaches, skin texture approaches, and/or the like. In one embodiment, with the identity of the personnel asset (e.g., operator) determined, the appropriate computing entity (e.g., management system 110) can identify the mobile asset ID for the mobile asset 100 to which the personnel asset (e.g., operator) is assigned or that the personnel asset (e.g., operator) owns, for example. In addition, the image analysis may also involve interpretive/adaptive features such that erratic motion and/or preprogrammed behavior observations may trigger certain perceivable indicator(s). In one embodiment, such image data can be captured while the operator (e.g., personnel asset) is operating a mobile asset 100.

After identifying the mobile asset ID from the captured image data and/or the identity of the personnel asset (e.g., operator) from the captured image data, the appropriate computing entity (e.g., management system 110) can make any necessary determinations and perform any desired actions (Block 910 of FIG. 9). Such determinations may include determining whether the mobile asset ID corresponds to a mobile asset 100 (a) within a specific fleet of mobile assets 100, (b) with certain permissions or privileges, (c) that is authorized to cross a border, (d) that is authorized to enter or exit a staging area or checkpoint, (e) that has been properly inspected, (f) that is under a specified weight, (g) with a properly captured mobile asset ID, (h) to initiate generation of electronic preclearance documents for customs officials, and/or the like. Such determinations may also include determining whether the personnel asset (a) has certain permissions or privileges, (b) is authorized to cross a border, (c) is authorized to enter or exit a staging area or checkpoint, and/or the like. The same also be used to initiate generation of electronic preclearance documents for customs officials or to determine whether the operator (e.g., personnel asset) is or is not operating the correct mobile asset 100 based on the mobile asset ID to which he or she is assigned.

Based on the determination, the appropriate computing entity (e.g., management system 110) can transmit/send an instruction to one or more perceivable indicators 145 to initiate or terminate a perceivable indication. For example, in response to (e.g., after) the management system 110 determining that a mobile asset's 100 mobile asset ID has or has not been properly captured (and/or that a personnel asset's identity has or has not been properly captured), the management system 110 can transmit an instruction to the appropriate perceivable indicators 145 to provide or generate a perceivable indication. In another example, in response to (e.g., after) the management system 110 determining that a mobile asset 100 associated with mobile asset ID (and/or that an identified personnel asset) is or is not authorized to enter or exit a staging area, checkpoint area, or customs area, the management system 110 can transmit an instruction to the appropriate perceivable indicators 145 to provide or generate a perceivable indication. In still another example, in response to (e.g., after) the management system 110 determining that the identified operator (e.g., personnel asset) is or is not operating the correct mobile asset 100, the management system 110 can transmit an instruction to the appropriate perceivable indicators 145 to provide or generate a perceivable indication. As will be recognized, a variety of other approaches and techniques may also be used to adapt to various needs and circumstances.

4. Generate Perceivable Indication

In one embodiment, the one or more perceivable indicators 145 can receive the instruction to initiate or terminate a perceivable indication (Blocks 915 and 920 of FIG. 9). The perceivable indicators 145 may then provide or generate the corresponding perceivable indications, such as changing a red light to a green light on a stop light, flashing the lights on a beacon, generating a specific sound, provide visual instructions, lock or unlock and/or open or close a gate, raise or lower a boom barrier gate, and/or the like. Such perceivable indications may be used to provide notice to the operator of the mobile asset 100 (e.g., personnel asset) that he or she can or cannot proceed or perhaps take other actions. As will be recognized, a variety of other approaches and techniques may also be used.

Additionally, the appropriate computing entity (e.g., imaging device 105, management system 110, RFID reader/interrogator 140, perceivable indicator 145, mobile device 150, and/or the like) can generate notifications for other entities to log the movement of mobile assets 100 and/or personnel. This may aid in preparing the appropriate documentation for customs clearances well in advance of the mobile asset 100, for example, crossing a border. As will be recognized, a variety of other approaches and techniques can be used to adapt to various needs and circumstances.

c. Combined Approach

As will be recognized, a variety of other approaches and techniques may be used to adapt to various needs and circumstances. For example, a combination of the above-discussed approaches can be used together, e.g., using the RFID-based approach and the image-based approach together.

Additionally, the appropriate computing entity (e.g., imaging device 105, management system 110, RFID reader/interrogator 140, perceivable indicator 145, mobile device 150, and/or the like) can generate notifications for other entities to log the movement of mobile assets 100 and/or personnel. This may aid in preparing the appropriate documentation for customs clearances well in advance of the mobile asset 100, for example, crossing a border. As will be recognized, a variety of other approaches and techniques can be used to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for identifying a mobile asset, the method comprising:

defining, via one or more processors, a geofenced area around a geographic area in which one or more coordinates of the defined geofenced area are stored in a memory;

monitoring an estimated location of the mobile asset comprising a vehicle and in response to determining that the vehicle enters or exits a location corresponding to at least one of the coordinates of the defined geofenced area, triggering transmission, via the one or more processors, of a request to be received by a radio frequency identification (RFID) tag within a read range, the RFID tag affixed to the vehicle;

after transmitting the request to be received by the RFID tag within the read range, receiving, via the one or more processors, a response from the RFID tag, the response comprising a predefined mobile asset identifier that uniquely identifies the vehicle;

assigning, via the one or more processors, a preassigned fleet a plurality of permissions for a plurality of vehicles of the preassigned fleet to enter or exit one or more areas and cross a border of a customs area;

determining, via the one or more processors, whether the mobile asset is authorized for one or more activities associated with access to the one or more areas, the determination based at least in part on detecting that the predefined mobile asset identifier identifies the vehicle and detecting that the vehicle is within the preassigned fleet of the plurality of vehicles in response to analyzing the predefined mobile asset identifier; and after a determination that the vehicle is authorized for the one or more activities, generating, via the one or more processors, an instruction to one or more perceivable indicators to initiate a perceivable indication that the vehicle is authorized for the one or more activities.

2. The method of claim 1 further comprising, after a determination that the vehicle is not authorized for the one or more activities, generating an instruction to the one or more perceivable indicators to initiate a perceivable indication that the vehicle is not authorized for the one or more activities.

3. The method of claim 1, wherein the one or more activities are selected from the group consisting of (a) crossing one or more borders, (b) entering or exiting a staging area, and (c) entering or exiting a checkpoint.

4. The method of claim 1, wherein the request is transmitted based on one selected from the group consisting of a periodic basis, a regular basis, and a continuous basis.

5. The method of claim 1, wherein the request is transmitted after the vehicle enters or exits the defined geofenced area.

6. The method of claim 1, wherein the perceivable indicators are selected from the group consisting of (a) illuminating a light, (b) illuminating a beacon, (c) generating a specific sound, (d) providing visual instructions, (e) a locking gate, and (f) a boom barrier gate.

7. The method of claim 1, further comprising:

in response to detecting an instance in which the mobile asset exits the defined geofenced area, sending another request to the RFID tag, while the mobile asset is outside the defined geofenced area.

8. The method of claim 1, wherein:

the one or more activities comprises the vehicle entering or exiting the customs area.

9. An apparatus comprising at least one processor and at least one memory including computer program code, the at least one memory and the computer program code configured to, with the processor, cause the apparatus to at least:

define a geofenced area around a geographic area in which one or more coordinates of the defined geofenced area are stored in the memory;

monitor an estimated location of a mobile asset comprising a vehicle and in response to determining that the vehicle enters or exits a location corresponding to at least one of the coordinates of the defined geofenced area, trigger transmission of a request to be received by a radio frequency identification (RFID) tag within a read range, the RFID tag affixed to the vehicle;

after transmitting the request to be received by the RFID tag within the read range, receive a response from the RFID tag, the response comprising a predefined mobile asset identifier that uniquely identifies the vehicle;

assign a preassigned fleet a plurality of permissions for a plurality of vehicles of the preassigned fleet to enter or exit one or more areas and cross a border of a customs area;

determine whether the vehicle is authorized for one or more activities associated with access to the one or more areas, the determination based at least in part on detecting that the predefined mobile asset identifier identifies the vehicle and detecting that the vehicle is within the preassigned fleet of the plurality of vehicles; and after a determination that the vehicle is authorized for the one or more activities, generate an instruction to one or more perceivable indicators to initiate a perceivable indication that the vehicle is authorized for the one or more activities.

10. The apparatus of claim 9, wherein the memory and the computer program code are further configured to, with the processor, cause the apparatus to, after a determination that the vehicle is not authorized for the one or more activities, generate an instruction to the one or more perceivable indicators to initiate a perceivable indication that the vehicle is not authorized for the one or more activities.

11. The apparatus of claim 9, wherein the one or more activities are selected from the group consisting of (a) crossing one or more borders, (b) entering or exiting a staging area, and (c) entering or exiting a checkpoint.

12. The apparatus of claim 9, wherein the request is transmitted based on one selected from the group consisting of a periodic basis, a regular basis, and a continuous basis.

13. The apparatus of claim 9, wherein the request is transmitted after the vehicle enters or exits the defined geofenced area.

14. The apparatus of claim 9, wherein the perceivable indicators are selected from the group consisting of (a) illuminating a light, (b) illuminating a beacon, (c) generating a specific sound, (d) providing visual instructions, (e) a locking gate, and (f) a boom barrier gate.

15. The apparatus of claim 9, wherein the memory and computer program code are further configured to, with the processor, cause the apparatus to:

in response to detecting an instance in which the mobile asset exits the defined geofenced area, send another request to the RFID tag, while the mobile asset is outside the defined geofenced area.

16. The apparatus of claim 9, wherein:

the one or more activities comprises the vehicle entering or exiting the customs area.

17. A computer program product for identifying a mobile asset, the computer program product comprising at least one non-transitory computer-readable storage medium having computer-readable program code portions stored therein, the computer-readable program code portions comprising:

an executable portion configured to define a geofenced area around a geographic area in which one or more coordinates of the defined geofenced area are stored in the storage medium;

an executable portion configured to monitor an estimated location of the mobile asset comprising a vehicle and in response to determining that the vehicle enters or exits a location corresponding to at least one of the coordinates of the defined geofenced area, trigger transmission of a request to be received by a radio frequency identification (RFID) tag within a read range, the RFID tag affixed to the vehicle;

an executable portion configured to, after transmitting the request to be received by the RFID tag within the read range, receive a response from the RFID tag, the response comprising a predefined mobile asset identifier that uniquely identifies the vehicle;

an executable portion configured to assign a preassigned fleet a plurality of permissions for a plurality of vehicles of the preassigned fleet to enter or exit one or more areas and cross a border of a customs area;

an executable portion configured to determine whether the vehicle is authorized for one or more activities associated with access to the one or more areas, the determination based at least in part on detecting that the predefined mobile asset identifier identifies the vehicle and detecting that the vehicle is within the preassigned fleet of the plurality of vehicles in response to analyzing the predefined mobile asset identifier; and an executable portion configured to, after a determination that the vehicle is authorized for the one or more activities, generate an instruction to one or more perceivable indicators to initiate a perceivable indication that the vehicle is authorized for the one or more activities.

18. The computer program product of claim 17 further comprising an executable portion configured to, after a determination that the vehicle is not authorized for the one or more activities, generate an instruction to the one or more perceivable indicators to initiate a perceivable indication that the vehicle is not authorized for the one or more activities.

19. The computer program product of claim 17, wherein the one or more activities are selected from the group consisting of (a) crossing one or more borders, (b) entering or exiting a staging area, and (c) entering or exiting a checkpoint.

20. The computer program product of claim 17, wherein the request is transmitted based on one selected from the group consisting of a periodic basis, a regular basis, and a continuous basis.

21. The computer program product of claim 17, wherein the request is transmitted after the vehicle enters or exits the defined geofenced area.

22. The computer program product of claim 17, wherein the perceivable indicators are selected from the group consisting of (a) illuminating a light, (b) illuminating a beacon, (c) generating a specific sound, (d) providing visual instructions, (e) a locking gate, and (f) a boom barrier gate.

23. The computer program product of claim 17, wherein:

the one or more activities comprises the vehicle entering or exiting the customs area.

* * * * *